United States Patent
Huang et al.

(10) Patent No.: US 10,880,934 B2
(45) Date of Patent: Dec. 29, 2020

(54) INTRA BASIC SERVICE SET SIGNALING FOR MULTIPLE ACCESS POINTS

(71) Applicant: Intel IP Corporation, Santa Clara, CA (US)

(72) Inventors: Po-Kai Huang, San Jose, CA (US); Ido Ouzieli, Tel Aviv (IL); Johannes Berg, Detmold (DE); Arik Klein, Givaat Shmuel (IL); Danny Ben-Ari, Tsur Natan (IL); Amir Hitron, Beit Ytzhak (IL); Laurent Cariou, Portland, OR (US); Robert Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/220,950

(22) Filed: Dec. 14, 2018

(65) Prior Publication Data

US 2019/0124706 A1 Apr. 25, 2019

Related U.S. Application Data

(60) Provisional application No. 62/599,592, filed on Dec. 15, 2017.

(51) Int. Cl.
| | |
|---|---|
| *H04W 48/08* | (2009.01) |
| *H04W 76/11* | (2018.01) |
| *H04W 40/24* | (2009.01) |
| *H04W 8/26* | (2009.01) |
| *H04W 72/04* | (2009.01) |
| *H04B 7/0413* | (2017.01) |

(Continued)

(52) U.S. Cl.
CPC .............. *H04W 76/11* (2018.02); *H04W 8/26* (2013.01); *H04W 40/244* (2013.01); *H04W 72/0446* (2013.01); *H04B 7/0413* (2013.01); *H04W 48/12* (2013.01); *H04W 84/12* (2013.01)

(58) Field of Classification Search
CPC .............. H04W 40/244; H04W 48/12; H04W 72/0446; H04W 76/11; H04W 84/12; H04W 8/26; H04W 74/006; H04W 74/0833; H04W 88/08; H04L 69/323
See application file for complete search history.

(56) References Cited

U.S. PATENT DOCUMENTS

| | | | |
|---|---|---|---|
| 2017/0105143 A1* | 4/2017 | Seok | H04L 5/0091 |
| 2018/0054759 A1* | 2/2018 | Seok | H04W 48/10 |

(Continued)

*Primary Examiner* — Phuc H Tran
(74) *Attorney, Agent, or Firm* — Eversheds Sutherland (US) LLP

(57) ABSTRACT

This disclosure describes systems, methods, and devices related to intra-basic service set (BSS) signaling for multiple access points (APs). A device may determine one or more access points (APs), wherein the one or more APs are in a set of multiple basic service sets (BSSs) identified as intra-BSS. The device may include, in a first frame, a high-efficiency operation element comprising a bit associated with an indicator of the set of multiple BSSs. The device may include, in a second frame, an association identification (AID) value, wherein the AID value is associated with the device. The device may cause to send the first frame a first station device of one or more station devices. The device may cause to send the second frame to a second station device of the one or more station devices.

18 Claims, 5 Drawing Sheets

(51) Int. Cl.
*H04W 84/12* (2009.01)
*H04W 48/12* (2009.01)

(56) References Cited

U.S. PATENT DOCUMENTS

2018/0098378 A1* 4/2018 Patil .................. H04W 48/12
2019/0007977 A1* 1/2019 Asterjadhi .......... H04W 74/006
2019/0021091 A1* 1/2019 Ko .................. H04W 72/0453
2019/0261419 A1* 8/2019 Noh ................ H04W 74/0816

* cited by examiner

INTRA BASIC SERVICE SET SIGNALING FOR MULTIPLE ACCESS POINTS

CROSS-REFERENCE TO RELATED APPLICATION(S)

This application claims the benefit of U.S. Provisional Application No. 62/599,592, filed Dec. 15, 2017, the disclosure of which is incorporated herein by reference as if set forth in full.

TECHNICAL FIELD

This disclosure generally relates to systems and methods for wireless communications and, more particularly, to intra basic service set (BSS) signaling for multiple access points (APs).

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
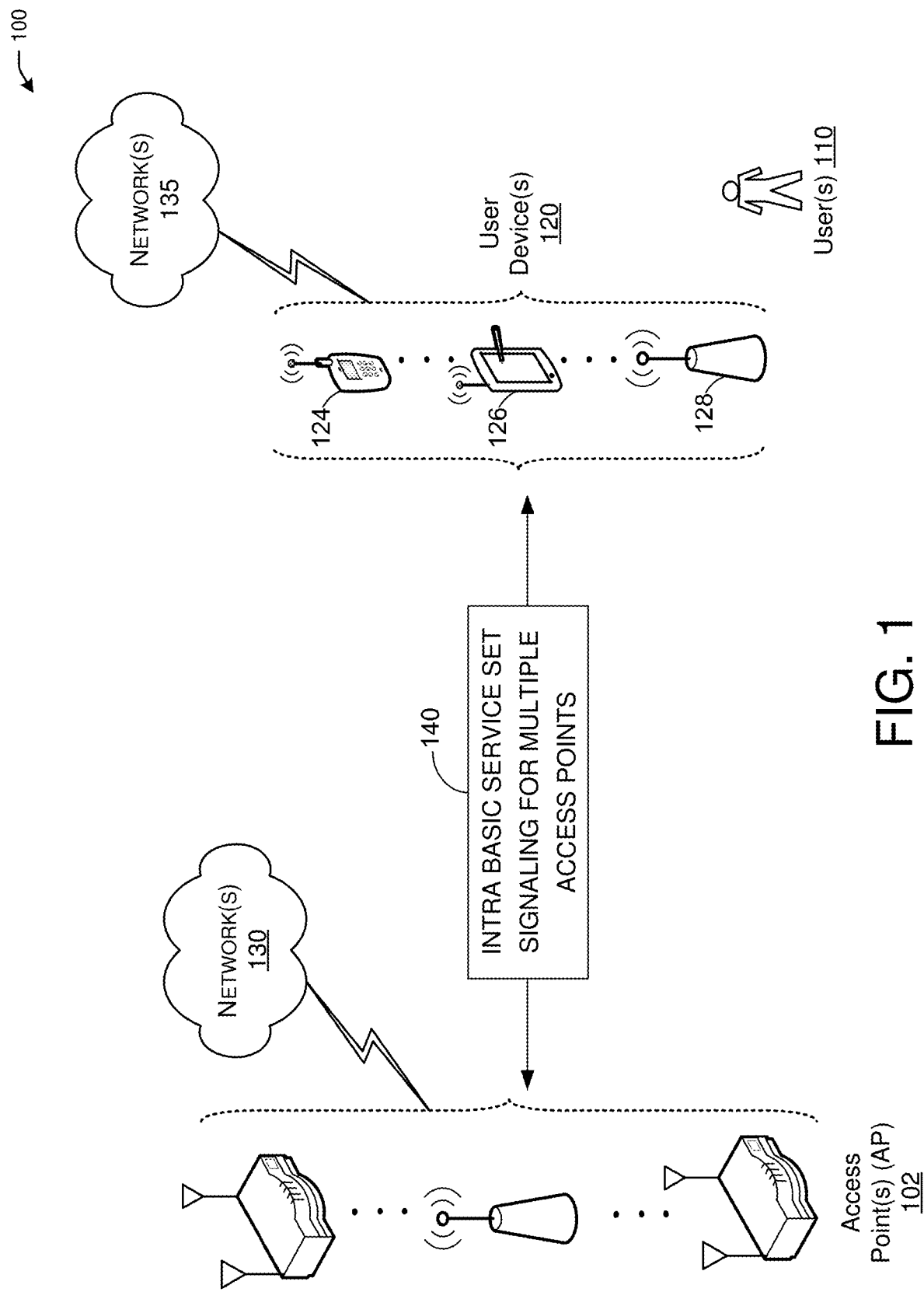
FIG. 1 is a network diagram illustrating an example network environment for intra basic service set (BSS) signaling for multiple access points (APs), in accordance with one or more example embodiments of the present disclosure.

Example embodiments described herein provide certain systems, methods, and devices for intra-BSS signaling for multiple APs. The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Institute of Electrical and Electronics Engineers (IEEE) 802.11v specification introduced the concept of multiple BSSID element for multiple virtual APs (VAP). The scenario is that there can be multiple virtual APs in one physical location to serve station devices (STAs) in different groups. These virtual APs form a multiple BSSID set. However, due to the existence of legacy STAs, which do not support the multiple BSSID element in frames, if an AP wants to support legacy STAs, an AP has to transmit multiple legacy beacons. If an AP wants to use the functionalities designed in 11ax on top of multiple BSSID element, then AP has to have multiple BSSID element when multiple beacons are transmitted, which violates the original design intention of multiple BSSID element and leads to more complicated scenarios that need to be fixed in the 802.11ax specification including but not limited to how different elements are carried in different beacons, how HE STAs find the beacon with multiple BSSID element.

It is possible for an AP to have multiple beacons and have multiple BSSID element at the same time to support legacy STAs and enable the three functionalities for 802.11ax STAs. This design deviates from the original design intention of multiple BSSID element to have a single beacon or a single probe response, and further works will be required in the spec to enable the operation like HE STA scanning behavior in this scenario.

Example embodiments of the present disclosure relate to systems, methods, and devices for intra-BSS signaling for multiple APs.

In one or more embodiments, an intra-BSS signaling for multiple APs may limit the transmission of beacon in multiple BSSID set to one (e.g., the transmitted BSSID beacon), and design additional schemes to enable the three functionalities when multiple beacons are transmitted to support legacy STAs.

In one or more embodiments, an intra-BSS signaling for multiple APs may align with the original design intention of multiple BSSID element, which is to have only one beacon in the multiple BSSID set, and have STA that supports multiple BSSID element to only scan for the transmitted BSSID beacon. No additional schemes that further complicate the original design of multiple BSSID element is required for this case. The separate proposed signaling when there is no multiple BSSID element then enables three functionalities and support the legacy STAs that do not support multiple BSSID element.

In one or more embodiments, an intra-BSS signaling for multiple APs system may associate an AP with a "transmitted BSSID" when the AP is responsible for transmitting one beacon frame on behalf of the other APs in the set. The BSSID of the AP belonging to a multiple BSSID set is referred to as the transmitted BSSID if the AP includes the Multiple BSSID element in the Beacon frame that it transmits.

In one or more embodiments, in a multiple BSSID set, there may not be more than one AP corresponding to the transmitted BSSID. The BSSID of an AP belonging to a multiple BSSID set is a non-transmitted BSSID for an AP that is not designated with the transmitted BSSID. Among all AP STAs in multiple BSSID set, only the AP corresponding to the transmitted BSSID shall transmit a beacon frame.

In one or more embodiments, an intra-BSS signaling for multiple APs system may facilitate the identification of intra-BSS for all the BSSs in a multiple BSSID set using one or more classifications. In that case, a multiple BSSID element is not needed because each AP associated with the multiple BSSID set is responsible for sending its own beacon frame. However the intra-BSS signaling for multiple APs system may facilitate that and STA receiving one of these beacon frames will be capable of creating a frame from AP associated with the multiple BSSID set as an intra-BSS AP. In other words, the STA will be capable based on information received in the beacon frame to determine that the APs are co-located APs.

In one or more embodiments, an intra-BSS signaling for multiple APs system may use a transmitted BSSID control frame in order to notify STAs of the multiple BSSID set. For example, the AP and a multiple BSSID set with a BSSID equal to the transmitted BSSID can send a control frame, like a trigger frame, with a transmitting station address (TA) equal to the transmitted BSSID in order to solicit response from the STAs in different BSSs of the multiple BSSID set. For example, if there are three BSSs in the multiple BSSID set, each of these BSSs may be associated with an AP and each AP may have one or more associated STAs. The AP associated with the transmitted BSSID, may be able to trigger all the STAs in the three different BSSs of the multiple BSSID set. Whenever, and STA determines that the TA of the received control frame (e.g., a trigger frame) is equal to the transmitted BSSID, the STA would respond to the control frame instead of ignoring it, even though the AP associated with the transmitted BSSID may not be associated with the STA.

In one more embodiments, an intra-BSS signaling for multiple APs system may facilitate using broadcast RU signaling for different BSSs in the multiple BSSID set in the HE MU PPDU. A broadcast RU is a resource unit within an HE MU PPDU, intended for unassociated STAs or any STA associated with the BSS that may be identified by a specific STA ID, where n is equal to the maximum co-located BSSID indicator field ("MaxBSSID Indicator field") advertised by the AP in the multiple BSSID element.

For example, in order to identify one or more APs in the multiple BSSID set, a mechanism may be used to allocate one or more AIDs to the APs of the multiple BSSID set. For example in the HE MU PPDU of an AP in a multiple BSSID said, the AID may be set to a value of a range of 0 to $2^n-1$, where $2^n$ is the maximum number of APs in the multiple BSSID set. In one or more examples, the AID of value 0 is used to indicate the BSS where BSSID equal to the transmitted BSSID. Further, AID of value x within the range may be used to indicate the BSS with BSSID that has n least significant bits (LSBs) equal to the n LSBs of the transmitted BSSID plus x modulo $2^n$. The n is a positive integer. The n may associated with the maximum number of APs in the multiple BSSID set. For example, if there are four APs, then n would be equal to 2. The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of intra-BSS signaling for multiple APs, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 4:
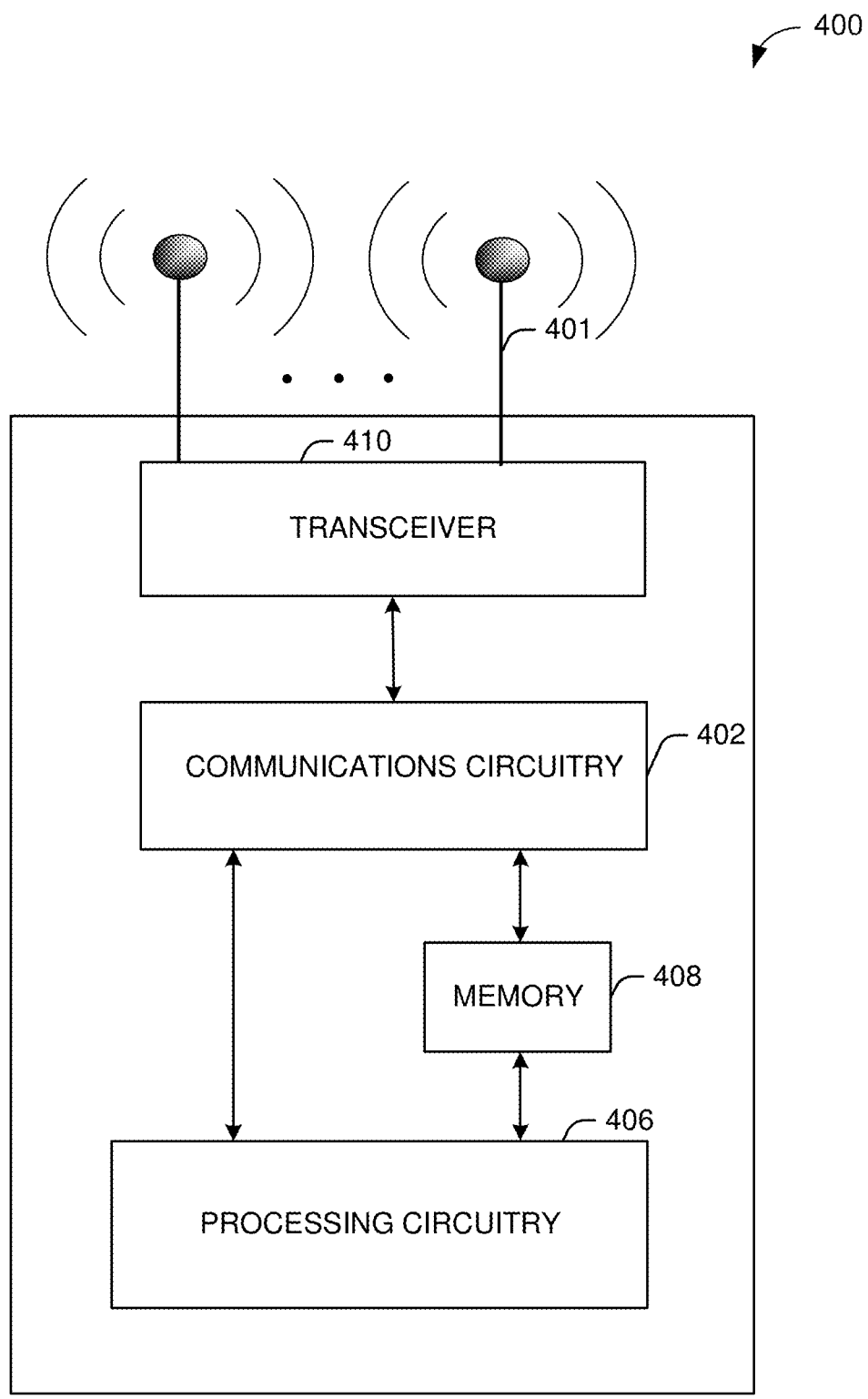
FIG. 4 illustrates a functional diagram of an exemplary communication station that may be suitable for use as a user device, in accordance with one or more example embodiments of the present disclosure.
Figure 5:
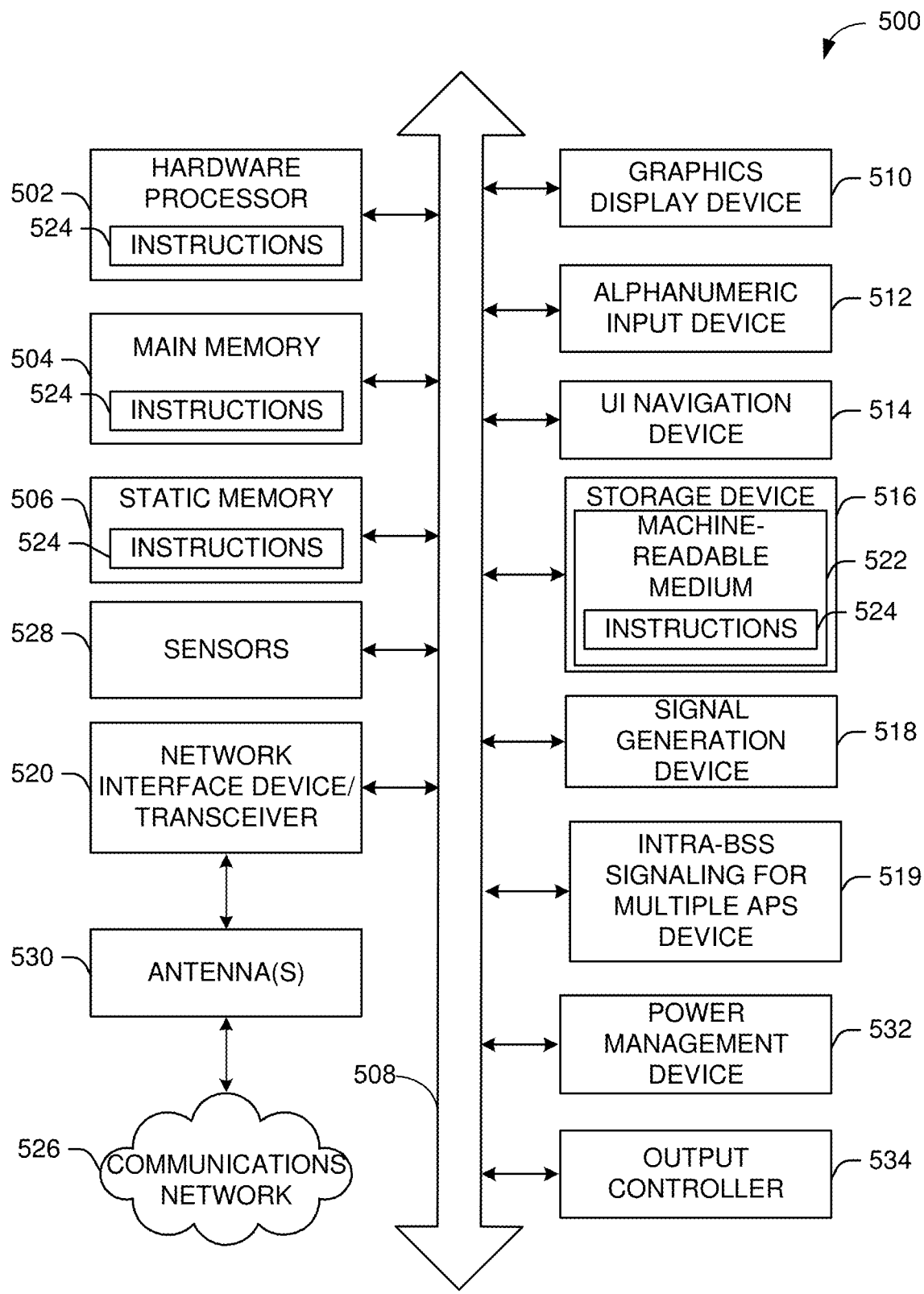
FIG. 5 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 4 and/or the example machine/system of FIG. 5.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device (s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad, 802.11ay). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, a user device 120 may be in communication with one or more APs 102. For example, AP 102 may implement an intra-BSS signaling for multiple APs 140 with one or more user devices 120.

It is understood that the above descriptions are for purposes of illustration and are not meant to be limiting.

Figure 2:
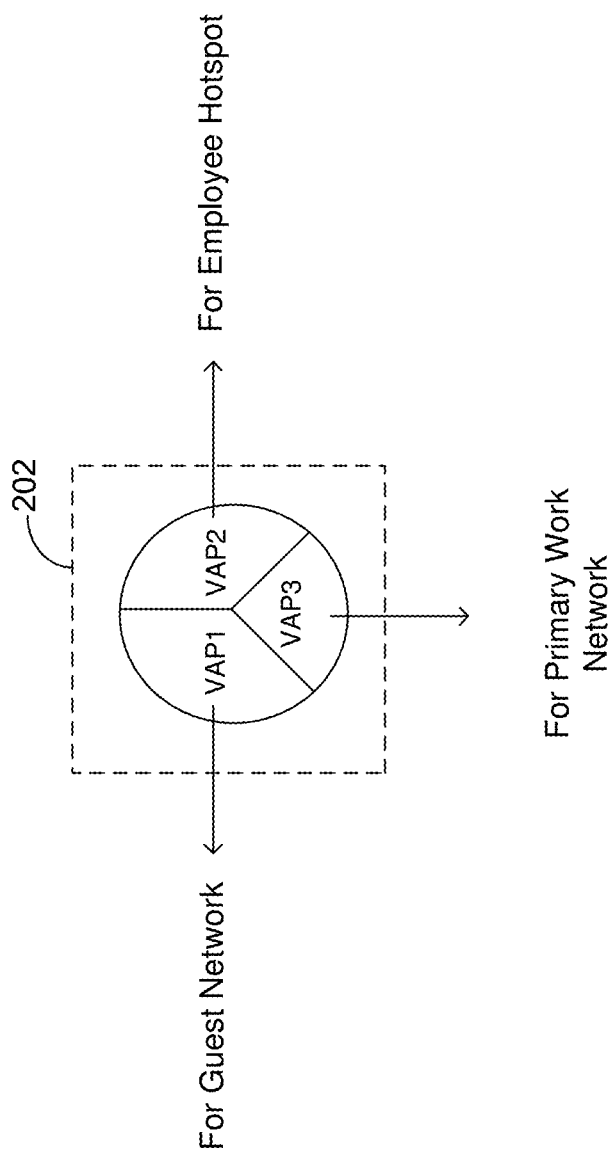
FIG. 2 depicts an illustrative schematic diagram for intra-BSS signaling for multiple APs, in accordance with one or more example embodiments of the present disclosure.

FIG. 2 depicts an illustrative schematic diagram 200 for intra-BSS signaling for multiple APs, in accordance with one or more example embodiments of the present disclosure.

In 802.11v specification, the concept of multiple BSSID element for multiple virtual APs (VAP) is introduced. The scenario is that there can be multiple virtual APs in one physical location to serve STAs in different groups. These virtual APs are in a multiple BSSID set. For example, there can be 3 VAPs (e.g., VAP1, VAP2, and VAP3) in one physical AP 202 located in an enterprise building to serve the guest network, the employee hotspot network, and primary work network as shown in FIG. 2.

In some scenarios with multiple APs, there could be multiple beacons and multiple probe responses when responding a broadcast probe request. To improve the efficiency in 802.11v, a multiple BSSID element is introduced such that one of the AP in the multiple BSSID set, referred to as the AP with BSSID equal to "transmitted BSSID," can send one beacon or one probe response that includes a multiple BSSID element. The multiple BSSID element includes information of all APs in the multiple BSSID set. Note that the support of multiple BSSID element is optional for legacy STAs. Hence, in reality, multiple beacons or multiple probe responses are still transmitted.

IEEE 802.11ax mandates the support of multiple BSSID element for 802.11ax STAs and add additional three functionalities for the multiple BSSID concept:

(1) Identification of Intra-BSS for all the BSSs in the multiple BSSID set, where an STA associated with a AP in a multiple BSSID may treat the frame from any AP in the multiple BSSID set as intra-BSS;

(2) Transmitted BSSID Control frame, where the AP in a multiple BSSID set with BSSID equal to transmitted BSSID can send a control frame, like Trigger frame, with TA equal to the transmitted BSSID to solicit response from STAs in different BSSs in the multiple BSSID set; and (3) Broadcast RU signaling for different BSSs in the multiple BSSID set in HE MU PPDU.

In an HE MU PPDU of an AP in a multiple BSSID set, AID 0 to $2^n-1$, where $2^n$ is the maximum number of APs in the multiple BSSID set, is used for indication of broadcast RU signaling for BSSs in the multiple BSSID set. AID 0 is used to indicate the BSS with BSSID equal to transmitted BSSID. AID x is used to indicate the BSS with BSSID that has n LSBs equal to the n LSBs of transmitted BSSID plus x mod $2^n$.

An intra-BSS signaling for multiple APs may limit the scenarios to only two cases by allowing only the AP that is in the multiple BSSID set and has BSSID equal to transmitted BSSID to transmit beacon and probe response(s) based on the conditions of the network. For example, based on implementation, if the designated AP that has a BSSID equal to the transmitted BSSID may determine whether the STAs that are going to be communicating with the APs in the multiple BSSID set (co-located APs) can support the multiple BSSID element and if not, determine to communicate with these STAs in a way to allow the STAs to determine that the co-located APs are part of an intra-BSS set.

Case 1: only transmitted BSSID AP transmits beacon frame or probe response, which has multiple BSSID element.

Case 2: multiple co-located APs transmit beacon frames or probe responses, without using the multiple BSSID element in any beacon frames or probe responses In one or more embodiments, an intra-BSS signaling for multiple APs system may facilitate signaling in Case 2 to enable the three functionalities designed in 802.11ax. In the following, it is assumed that the signaling is from the AP and that an STA receives the signaling. For functionality 1, an intra-BSS signaling for multiple APs system may identify a set of APs as Intra-BSS APs for the associated STAs.

In one or more embodiments, an HE MU PPDU may determine a field called intra-BSS set indicator in the HE operation element from the AP. A bit in HE operation element may be used to indicate if the Intra-BSS set indicator is present. In Case 1, when the multiple BSSID element is used, intra-BSS set indicator may not be present. It should be understood that the term element refers to an information element (IE).

In one or more embodiments, the intra-BSS set indicator indicates a value of "n" such that for an associated STA, if a received frame has BSSID field with 48-n most significant bits (MSBs) equal to the 48-n MSBs of the BSSID of the transmitter of HE operation element, then the frame is regarded as intra-BSS frame.

In one or more embodiments, if the received frame has a receiving station address (RA) and a transmitting station address (TA), and either 48-n MSBs of the RA or the TA is equal to the 48-n MSBs of the BSSID of the transmitter of HE operation element, then the frame is regarded as intra-BSS. If a received frame has a BSSID field with 48-n MSBs not equal to the 48-n MSBs of the BSSID of the transmitter of HE operation element, then the frame is regarded as inter-BSS.

In one or more embodiments, if the received frame has RA and TA, and the 48-n MSBs of RA and TA are not equal to the 48-n MSBs of BSSID of the transmitter of HE operation element, then the frame is regarded as inter-BSS. The maximum indicated value of Intra-BSS set is limited to 8.

In one or more embodiments, the BSS that is in the intra-BSS set may use the same BSS color in the HE operation element. That is, all APs that are members of a multiple BSSID set or co-located BSSID set will use the same BSS color. It should be understood that a BSS color is a numerical identifier of a particular BSS.

In one or more embodiments, an intra-BSS signaling for multiple APs system may define (for functionality 2) a control BSSID concept. For the STA, a control BSSID may be different from the BSSID of the associated AP. When an STA associates with an AP having a BSSID, the STA would know to associate the AP with that BSSID.

In one or more embodiments, the control BSSID may be carried in the TA of the control frame such as trigger frame to solicit responses from an STA that is associated with a BSS with BSSID different from the control BSSID. Reception Support of control BSSID in control frame is optional for a non-AP STA. 48-n MSBs of control BSSID is equal to the 48-n MSBs of BSSID of the transmitter of HE operation element.

In one or more embodiments, in order to indicate "n" least significant bits (LSBs) of the control BSSID, (1) the n LSBs of the control BSSID may be equal to 0, or (2) in the HE operation element, n LSBs of the control BSSID may be indicated in a field with one byte called "partial control BSSID". For example, one bit in HE operation element may be used to indicate if partial control BSSID field is present.

In one or more embodiments, for functionality 3, an intra-BSS signaling for multiple APs system may define a "broadcast resource unit (RU)" indication in HE MU PPDU for a BSS in the intra-BSS set. A broadcast RU is a resource unit within an HE MU PPDU, intended for unassociated STAs or any STA associated with the BSS that may be identified by a specific STA ID, where n is equal to the MaxBSSID Indicator field advertised by the AP in the Multiple BSSID element.

In one or more embodiments, a BSS in the intra-BSS set may not allocatean association identification (AID) value 0 to $2^n-1$, where n is indicated in the intra-BSS set Indicator, to an associated STA. That is the AID values in the range of 0 to $2^n-1$ are reserved for the APs in the intra-BSS set.

In one or more embodiments, based on the indication of n LSBs of the control BSSID, (1) the value of n LSBs of the BSSID of the transmitter of HE operation element may be the AID value used to indicate broadcast RU in HE PPDU for the BSS of the transmitter of HE operation element, or (2) the value of n LSBs of BSSID of the transmitter of HE operation minus the value of n LSBs of control BSSID mod $2^n$ is the AID value used to indicate broadcast RU in HE PPDU for the BSS of the transmitter of HE operation element.

It is understood that the above descriptions are for purposes of illustration and are not meant to be limiting.

Figure 3:
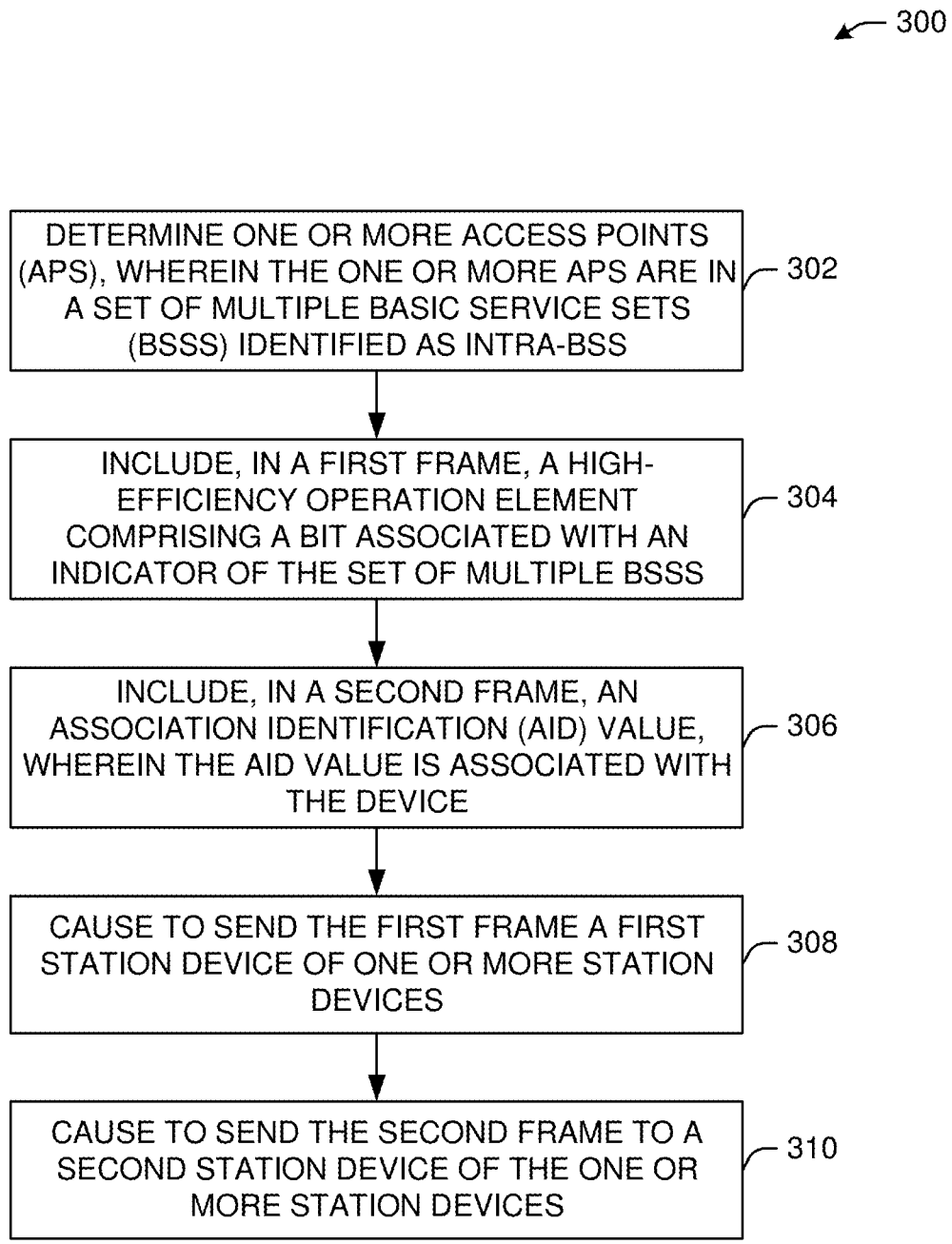
FIG. 3 illustrates a flow diagram of illustrative process for intra-BSS signaling for multiple APs, in accordance with one or more example embodiments of the present disclosure.

FIG. 3 illustrates a flow diagram of illustrative process 300 for an illustrative intra-BSS signaling for multiple APs, in accordance with one or more example embodiments of the present disclosure.

At block 302, a device (e.g., the user device(s) 120 and/or the AP 102 of FIG. 1) may determine one or more access points (APs), wherein the one or more APs are in a set of multiple basic service sets (BSSs) identified as intra-BSS. The one or more APs in the set of multiple BSSs have a same BSS color. The device may be in a first BSS. The device may have a basic service set identification (BSSID) that may be determined from the set of multiple BSSs, and the BSSID may be a control BSSID. The set of the multiple BSSs may be a co-located basic service set identification (BSSID) set or a co-hosted BSSID set. The device may determine a resource unit intended for an unassociated STA. Each BSS in the set of the multiple BSSs may have a specific AID value from a range of AID values between 0 and $2^n-1$. Further, each associated STAs of the BSS in the set of the multiple BSSs has a specific AID value from a range of AID values larger than $2^n-1$.

At block 304, the device may include, in a first frame, a high-efficiency operation element comprising a bit associated with an indicator of the set of multiple BSSs. the first frame does not contain a multiple BSSID element. In some examples, a number n of least significant bits (LSBs) of the control BSSID may be in indicated in the first frame, and where n may be indicated by the indicator of the set of multiple BSSs.

At block 306, the device may include, in a second frame, an association identification (AID) value, wherein the AID value is associated with the device. In some examples, the AID value may be derived from a range of AID values between 0 and $2^n-1$, where n is a positive integer, and wherein $2^n$ is a maximum number of BSSIDs in the set of multiple BSSs At block 308, the device may cause to send the first frame a first station device of one or more station devices. In some examples, the device may send a control frame to solicit response from the second station device in a second BSS of the set of the multiple BSSs, wherein the second BSS is different from the first BSS.

At block 310, the device may cause to send the second frame to a second station device of the one or more station devices.

It is understood that the above descriptions are for purposes of illustration and are not meant to be limiting.

FIG. 4 shows a functional diagram of an exemplary communication station 400 in accordance with some embodiments. In one embodiment, FIG. 4 illustrates a functional block diagram of a communication station that may be suitable for use as an AP 102 (FIG. 1) or user device 120 (FIG. 1) in accordance with some embodiments. The communication station 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 400 may include communications circuitry 402 and a transceiver 410 for transmitting and receiving signals to and from other communication stations using one or more antennas 401. The communications circuitry 402 may include circuitry that can operate the physical layer (PHY) communications and/or media access control (MAC) communications for controlling access to the wireless medium, and/or any other communications layers for transmitting and receiving signals. The communication station 400 may also include processing circuitry 406 and memory 408 arranged to perform the operations described herein. In some embodiments, the communications circuitry 402 and the processing circuitry 406 may be configured to perform operations detailed in FIGS. 1-3.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication station 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 400 may include one or more of a keyboard, a display, a non-volatile memory port, multiple antennas, a graphics processor, an application processor, speakers, and other mobile device elements. The display may be an LCD screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 400 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 400 may include one or more processors and may be configured with instructions stored on a computer-readable storage device memory.

FIG. 5 illustrates a block diagram of an example of a machine 500 or system upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518 (e.g., a speaker), an intra-BSS signaling for multiple APs device 519, a network interface device/transceiver 520 coupled to antenna(s) 530, and one or more sensors 528, such as a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 502 for generation and processing of the baseband signals and for controlling operations of the main memory 504, the storage device 516, and/or the intra-BSS signaling for multiple APs device 519. The baseband processor may be provided on a single radio card, a single chip, or an integrated circuit (IC).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

The intra-BSS signaling for multiple APs device 519 may carry out or perform any of the operations and processes (e.g., process 300) described and shown above.

It is understood that the above are only a subset of what the intra-BSS signaling for multiple APs device 519 may be configured to perform and that other functions included throughout this disclosure may also be performed by the intra-BSS signaling for multiple APs device 519.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: determine one or more access points (APs), wherein the one or more APs are in a set of multiple basic service sets (BSSs) identified as intra-BSS; include, in a first frame, a high-efficiency operation element comprising a bit associated with an indicator of the set of multiple BSSs; include, in a second frame, an association identification (AID) value, wherein the AID value may be associated with the device; and cause to send the first frame a first station device of one or more station devices; and cause to send the second frame to a second station device of the one or more station devices.

Example 2 may include the device of example 1 and/or some other example herein, wherein a basic service set identification (BSSID) of the device may be determined from the set of multiple BSSs, and wherein the BSSID may be a control BSSID.

Example 3 may include the device of example 1 and/or some other example herein, wherein the set of the multiple BSSs may be a co-located basic service set identification (BSSID) set or a co-hosted BSSID set.

Example 4 may include the device of example 1 and/or some other example herein, wherein the first frame does not contain a multiple BSSID element.

Example 5 may include the device of example 1 and/or some other example herein, wherein the processing circuitry may be further configured to determine a resource unit intended for an unassociated STA.

Example 6 may include the device of example 1 and/or some other example herein, wherein the one or more APs in the set of multiple BSSs have a same BSS color.

Example 7 may include the device of example 1 and/or some other example herein, wherein the device may be in a first BSS.

Example 8 may include the device of example 7 and/or some other example herein, wherein the processing circuitry may be further configured to cause to send a control frame to solicit response from the second station device in a second BSS of the set of the multiple BSSs, wherein the second BSS may be different from the first BSS.

Example 9 may include the device of example 7 and/or some other example herein, wherein a number n of least significant bits (LSBs) of the control BSSID may be in indicated in the first frame, and wherein n may be indicated by the indicator of the set of multiple BSSs.

Example 10 may include the device of example 1 and/or some other example herein, wherein the AID value may be derived from a range of AID values between 0 and 2n−1, wherein n may be a positive integer, and wherein 2n may be a maximum number of BSSIDs in the set of multiple BSSs.

Example 11 may include the device of example 10 and/or some other example herein, wherein each BSS in the set of the multiple BSSs has a specific AID value from a range of AID values between 0 and 2n−1.

Example 12 may include the device of example 10 and/or some other example herein, wherein each associated STAs of the BSS in the set of the multiple BSSs has a specific AID value from a range of AID values larger than 2n−1.

Example 13 may include the device of example 1 and/or some other example herein, further comprising a transceiver configured to transmit and receive wireless signals.

Example 14 may include the device of example 7 and/or some other example herein, further comprising an antenna coupled to the transceiver.

Example 15 may include a non-transitory computer-readable medium storing computer-executable instructions which when executed by one or more processors result in performing operations comprising: determining one or more access points (APs), wherein the one or more APs are in a set of multiple basic service sets (BSSs) identified as intra-BSS; including, in a first frame, a high-efficiency operation element comprising a bit associated with an indicator of the set of multiple BSSs; including, in a second frame, an association identification (AID) value, wherein the AID value may be associated with the device; and causing to send the first frame a first station device of one or more station devices; and causing to send the second frame to a second station device of the one or more station devices.

Example 16 may include the non-transitory computer-readable medium of example 15 and/or some other example herein, wherein a basic service set identification (BSSID) of the device may be determined from the set of multiple BSSs, and wherein the BSSID may be a control BSSID.

Example 17 may include the non-transitory computer-readable medium of example 15 and/or some other example herein, wherein the set of the multiple BSSs may be a co-located basic service set identification (BSSID) set or a co-hosted BSSID set.

Example 18 may include the non-transitory computer-readable medium of example 15 and/or some other example herein, wherein the first frame does not contain a multiple BSSID element.

Example 19 may include the non-transitory computer-readable medium of example 15 and/or some other example herein, wherein the operations further comprise determining a resource unit intended for an unassociated STA.

Example 20 may include the non-transitory computer-readable medium of example 15 and/or some other example herein, wherein the one or more APs in the set of multiple BSSs have a same BSS color.

Example 21 may include the non-transitory computer-readable medium of example 15 and/or some other example herein, wherein the device may be in a first BSS.

Example 22 may include the non-transitory computer-readable medium of example 21 and/or some other example herein, wherein the operations further comprise causing to send a control frame to solicit response from the second station device in a second BSS of the set of the multiple BSSs, wherein the second BSS may be different from the first BSS.

Example 23 may include the non-transitory computer-readable medium of example 21 and/or some other example herein, wherein a number n of least significant bits (LSBs) of the control BSSID may be in indicated in the first frame, and wherein n may be indicated by the indicator of the set of multiple BSSs.

Example 24 may include the non-transitory computer-readable medium of example 15 and/or some other example herein, wherein the AID value may be derived from a range of AID values between 0 and 2n−1, wherein n may be a positive integer, and wherein 2n may be a maximum number of BSSIDs in the set of multiple BSSs.

Example 25 may include the non-transitory computer-readable medium of example 24 and/or some other example herein, wherein each BSS in the set of the multiple BSSs has a specific AID value from a range of AID values between 0 and 2n−1.

Example 26 may include the non-transitory computer-readable medium of example 24 and/or some other example herein, wherein each associated STAs of the BSS in the set of the multiple BSSs has a specific AID value from a range of AID values larger than 2n−1.

Example 27 may include a method comprising: determining, by one or more processors, one or more access points (APs), wherein the one or more APs are in a set of multiple basic service sets (BSSs) identified as intra-BSS; including, in a first frame, a high-efficiency operation element comprising a bit associated with an indicator of the set of multiple BSSs; including, in a second frame, an association identification (AID) value, wherein the AID value may be associated with the device; and causing to send the first frame a first station device of one or more station devices; and causing to send the second frame to a second station device of the one or more station devices.

Example 28 may include the method of example 27 and/or some other example herein, wherein a basic service set identification (BSSID) of the device may be determined from the set of multiple BSSs, and wherein the BSSID may be a control BSSID.

Example 29 may include the method of example 27 and/or some other example herein, wherein the set of the multiple BSSs may be a co-located basic service set identification (BSSID) set or a co-hosted BSSID set.

Example 30 may include the method of example 27 and/or some other example herein, wherein the first frame does not contain a multiple BSSID element.

Example 31 may include the method of example 27 and/or some other example herein, further comprising determining a resource unit intended for an unassociated STA.

Example 32 may include the method of example 27 and/or some other example herein, wherein the one or more APs in the set of multiple BSSs have a same BSS color.

Example 33 may include the method of example 27 and/or some other example herein, wherein the device may be in a first BSS.

Example 34 may include the method of example 33 and/or some other example herein, further comprising causing to send a control frame to solicit response from the second station device in a second BSS of the set of the multiple BSSs, wherein the second BSS may be different from the first BSS.

Example 35 may include the method of example 33 and/or some other example herein, wherein a number n of least significant bits (LSBs) of the control BSSID may be in indicated in the first frame, and wherein n may be indicated by the indicator of the set of multiple BSSs.

Example 36 may include the method of example 27 and/or some other example herein, wherein the AID value may be derived from a range of AID values between 0 and 2n−1, wherein n may be a positive integer, and wherein 2n may be a maximum number of BSSIDs in the set of multiple BSSs.

Example 37 may include the method of example 36 and/or some other example herein, wherein each BSS in the set of the multiple BSSs has a specific AID value from a range of AID values between 0 and 2n−1.

Example 38 may include the method of example 36 and/or some other example herein, wherein each associated STAs of the BSS in the set of the multiple BSSs has a specific AID value from a range of AID values larger than 2n−1.

Example 39 may include an apparatus comprising means for: determining one or more access points (APs), wherein the one or more APs are in a set of multiple basic service sets (BSSs) identified as intra-BSS; including, in a first frame, a high-efficiency operation element comprising a bit associated with an indicator of the set of multiple BSSs; including, in a second frame, an association identification (AID) value, wherein the AID value may be associated with the device; and causing to send the first frame a first station device of one or more station devices; and causing to send the second frame to a second station device of the one or more station devices.

Example 40 may include the apparatus of example 39 and/or some other example herein, wherein a basic service set identification (BSSID) of the device may be determined from the set of multiple BSSs, and wherein the BSSID may be a control BSSID.

Example 41 may include the apparatus of example 39 and/or some other example herein, wherein the set of the multiple BSSs may be a co-located basic service set identification (BSSID) set or a co-hosted BSSID set.

Example 42 may include the apparatus of example 39 and/or some other example herein, wherein the first frame does not contain a multiple BSSID element.

Example 43 may include the apparatus of example 39 and/or some other example herein, further comprising determining a resource unit intended for an unassociated STA.

Example 44 may include the apparatus of example 39 and/or some other example herein, wherein the one or more APs in the set of multiple BSSs have a same BSS color.

Example 45 may include the apparatus of example 39 and/or some other example herein, wherein the device may be in a first BSS.

Example 46 may include the apparatus of example 45 and/or some other example herein, further comprising causing to send a control frame to solicit response from the second station device in a second BSS of the set of the multiple BSSs, wherein the second BSS may be different from the first BSS.

Example 47 may include the apparatus of example 45 and/or some other example herein, wherein a number n of least significant bits (LSBs) of the control BSSID may be in indicated in the first frame, and wherein n may be indicated by the indicator of the set of multiple BSSs.

Example 48 may include the apparatus of example 39 and/or some other example herein, wherein the AID value may be derived from a range of AID values between 0 and 2n−1, wherein n may be a positive integer, and wherein 2n may be a maximum number of BSSIDs in the set of multiple BSSs.

Example 49 may include the apparatus of example 48 and/or some other example herein, wherein each BSS in the set of the multiple BSSs has a specific AID value from a range of AID values between 0 and 2n−1.

Example 50 may include the apparatus of example 48 and/or some other example herein, wherein each associated STAs of the BSS in the set of the multiple BSSs has a specific AID value from a range of AID values larger than 2n−1.

Example 51 may include one or more non-transitory computer-readable media comprising instructions to cause an electronic device, upon execution of the instructions by one or more processors of the electronic device, to perform one or more elements of a method described in or related to any of examples 1-50, or any other method or process described herein Example 52 may include an apparatus comprising logic, modules, and/or circuitry to perform one or more elements of a method described in or related to any of examples 1-50, or any other method or process described herein.

Example 53 may include a method, technique, or process as described in or related to any of examples 1-50, or portions or parts thereof.

Example 54 may include an apparatus comprising: one or more processors and one or more computer readable media comprising instructions that, when executed by the one or more processors, cause the one or more processors to perform the method, techniques, or process as described in or related to any of examples 1-50, or portions thereof.

Example 55 may include a method of communicating in a wireless network as shown and described herein.

Example 56 may include a system for providing wireless communication as shown and described herein.

Example 57 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
    determine one or more access points (APs), wherein the one or more APs are in a set of multiple basic service sets (BSSs) identified as intra-BSS, wherein the set of the multiple BSSs is a co-located basic service set identification (BSSID) set;
    include, in a first frame, a high-efficiency operation element comprising a bit associated with an indicator of the set of multiple BSSs;
    include, in a second frame, an association identification (AID) value, wherein the AID value is associated with the device;
    cause to send the first frame a first station device of one or more station devices; and
    cause to send the second frame to a second station device of the one or more station devices.

2. The device of claim 1, wherein a basic service set identification (BSSID) of the device is determined from the set of multiple BSSs, and wherein the BSSID is a control BSSID.

3. The device of claim 1, wherein the first frame does not contain a multiple BSSID element.

4. The device of claim 1, wherein the processing circuitry is further configured to determine a resource unit intended for an unassociated STA.

5. The device of claim 1, wherein the one or more APs in the set of multiple BSSs have a same BSS color.

6. The device of claim 1, wherein the device is in a first BSS.

7. The device of claim 6, wherein the processing circuitry is further configured to cause to send a control frame to solicit response from the second station device in a second BSS of the set of the multiple BSSs, wherein the second BSS is different from the first BSS.

8. The device of claim 6, wherein a number of least significant bits (LSBs) of the control BSSID is in indicated in the first frame, and wherein n is indicated by the indicator of the set of multiple BSSs.

9. The device of claim 1, wherein the AID value is derived from a range of AID values between 0 and $2^n-1$, wherein n is a positive integer, and wherein $2^n$ is a maximum number of BSSIDs in the set of multiple BSSs.

10. The device of claim 9, wherein each BSS in the set of the multiple BSSs has a specific AID value from a range of AID values between 0 and $2^n-1$.

11. The device of claim 9, wherein each associated STAs of the BSS in the set of the multiple BSSs has a specific AID value from a range of AID values larger than $2^n-1$.

12. The device of claim 1, further comprising a transceiver configured to transmit and receive wireless signals.

13. The device of claim 12, further comprising an antenna coupled to the transceiver.

14. A non-transitory computer-readable medium storing computer-executable instructions which when executed by one or more processors result in performing operations comprising:
    determining one or more access points (APs), wherein the one or more APs are in a set of multiple basic service sets (BSSs) identified as intra-BSS, wherein the set of the multiple BSSs is a co-located basic service set identification (BSSID) set;
    including, in a first frame, a high-efficiency operation element comprising a bit associated with an indicator of the set of multiple BSSs;
    including, in a second frame, an association identification (AID) value, wherein the AID value is associated with the device;
    causing to send the first frame a first station device of one or more station devices; and
    causing to send the second frame to a second station device of the one or more station devices.

15. The non-transitory computer-readable medium of claim 14, wherein a basic service set identification (BSSID) of the device is determined from the set of multiple BSSs, and wherein the BSSID is a control BSSID.

16. The non-transitory computer-readable medium of claim 14, wherein the first frame does not contain a multiple BSSID element.

17. A method comprising:
    determining, by one or more processors, one or more access points (APs), wherein the one or more APs are in a set of multiple basic service sets (BSSs) identified as intra-BSS, wherein the set of the multiple BSSs is a co-located basic service set identification (BSSID) set;
    including, in a first frame, a high-efficiency operation element comprising a bit associated with an indicator of the set of multiple BSSs;
    including, in a second frame, an association identification (AID) value, wherein the AID value is associated with the device;
    causing to send the first frame a first station device of one or more station devices; and
    causing to send the second frame to a second station device of the one or more station devices.

18. The method of claim 17, wherein a basic service set identification (BSSID) of the device is determined from the set of multiple BSSs, and wherein the BSSID is a control BSSID.

* * * * *